United States Patent [19]

Spauschus et al.

[11] 4,100,092

[45] Jul. 11, 1978

[54] DUAL TEMPERATURE THERMAL ENERGY STORAGE COMPOSITION FOR HEAT PUMPS

[75] Inventors: Hans O. Spauschus, Prospect; Leopold Loeb, Louisville, both of Ky.

[73] Assignee: General Electric Company, Louisville, Ky.

[21] Appl. No.: 789,087

[22] Filed: Apr. 20, 1977

Related U.S. Application Data

[63] Continuation-in-part of Ser. No. 705,808, Jul. 16, 1976, abandoned.

[51] Int. Cl.$^2$ .................. C09K 5/06; F25B 29/00; F25B 13/00
[52] U.S. Cl. .................. 252/70; 252/67; 165/104 S; 62/324
[58] Field of Search .................. 252/70, 71, 67, 69; 62/324, 437; 237/2 B; 165/104 S, 62, 18; 260/413 R

[56] References Cited

U.S. PATENT DOCUMENTS

| | | | |
|---|---|---|---|
| 2,726,211 | 12/1955 | Schaefer | 252/70 |
| 2,847,834 | 8/1958 | Atchison | 62/324 X |
| 3,019,614 | 2/1962 | Schubert | 252/67 X |
| 3,301,001 | 1/1967 | McKinney | 62/324 X |
| 3,356,828 | 12/1967 | Furness | 252/70 X |
| 3,548,923 | 12/1970 | Nakano et al. | 165/18 |
| 3,823,089 | 7/1974 | Ryan et al. | 252/70 |

*Primary Examiner*—Harris A. Pitlick
*Attorney, Agent, or Firm*—Bruce A. Yungman; Francis H. Boos

[57] ABSTRACT

A combination thermal energy storage material capable of functioning in two discrete temperature ranges and comprised of two constituents, one of which has a phase change in the low temperature range between about 35° F. and about 55° F., and the other of which has a phase change in the high temperature range of between about 90° F. and about 130° F. Both temperature ranges are selected to correspond with the operable and desirable ranges for a heat pump operation. The two constituents are selected to be non-reactive with one another and in the mixture maintain independent phase change characteristics. However, the mixture itself alters in some cases, depending upon concentration, the melting points of each member of the pair so that the transition temperatures of the phase changes in the mixture are somewhat different and somewhat lower than the phase changes characteristic of the independent constituents and is dependent upon the concentration of the constituents in the mixture. The pairs of materials selected can, therefore, function in the heat pump environment to provide a heat sink into which heat may be dissipated for air-cooling purposes as well as a heat source which provides heat for heating purposes. Preferred pairs of materials include (a) a hydrocarbon oil paired with a wax fraction; (b) a $C_8$ fatty acid paired with a $C_{14}$-$C_{18}$ fatty acid; (c) a $C_{10}$-$C_{12}$ alcohol with a $C_{14}$-$C_{18}$ fatty acid; and (d) a $C_{10}$-$C_{12}$ alcohol with a wax fraction. Preferred weight percent of the components are also selected to conform to the high and low transition temperature ranges used as parameters.

16 Claims, 4 Drawing Figures

DUAL TEMPERATURE THERMAL ENERGY STORAGE COMPOSITION FOR HEAT PUMPS

This application is a continuation-in-part of co-pending Ser. No. 705,808 filed July 16, 1976, entitled "Dual Temperature Thermal Energy Storage Composition for Heat Pump," now abandoned.

Present concern for the conservation of energy has led investigators to focus upon more effective ways of using available energy sources. The effective storage of energy has also become of principal concern. Investigators have concluded that the ability to store and retrieve heat, as well as collect and dissipate heat, would contribute much to energy conservation. Air-to-air heat pumps have been devised to accomplish this end, but their effectiveness depends somewhat on the ambient conditions. It is well known, for example, that as outdoor temperature declines, efficiency of the heat pump drops off as it maintains constant indoor comfort conditions. Similarly, when operating in the cooling mode, the efficiency of the heat pump diminishes with increasing outdoor temperature. Therefore, there is a distinct advantage in being able to produce and store heat during periods of maximum heat pump efficiency, i.e., during the heat of the day, and to utilize such stored heat during periods when the heat pump will operate at lower efficiency, i.e., during the cooler portions of the night. Conversely, when the heat pump is operating in the cooling mode, the ability to store "coolness" during periods of maximum cooling efficiency will also provide a distinct advantage. It is to this end that the heat storage and heat sink material of this invention is directed.

The present invention is a combinaton thermal energy storage (TES) material capable of functioning in two discrete temperature ranges and comprised of two constituents, one of which has a phase change in the low temperature range of between about 35° F. and about 55° F., and the other of which has a phase change in the high temperature range of between about 90° F. and about 130° F. Both temperature ranges are selected to correspond with the operable and desirable ranges for a heat pump operation. The two constituents are selected to be non-reactive with one another and in the mixture maintain independent phase change characteristics. However, the mixture itself alters in some cases, depending upon concentration, the melting points of each member of the pair so that the transition temperatures of the phase changes in the mixture are somewhat different and somewhat lower than the phase changes characteristic of the independent constituents and is dependent upon the concentration of the constituents in the mixture. The pairs of materials selected can, therefore, function in the heat pump environment to provide a heat sink into which heat may be dissipated for air-cooling purposes as well as a heat source which provides heat for heating purposes. Preferred pairs of materials include (a) a hydrocarbon oil paired with a wax fraction; (b) a $C_8$ fatty acid paired with a $C_{14}$-$C_{18}$ fatty acid; (c) a $C_{10}$-$C_{12}$ alcohol with a $C_{14}$-$C_{18}$ fatty acid; and (d) a $C_{10}$-$C_{12}$ alcohol with a wax fraction. Preferred weight percent of the components are also selected to conform to the high and low temperature ranges used as parameters.

Heretofore, attempts have been made at providing a material that would store heat for later release. One such material is described in U.S. Pat. No. 2,726,211 Schaefer which uses a combination of fatty acids, such as stearic and oleic, in a binary system but uses the unsaturated oleic as a fatty acid, and no independent or discrete transition temperatures are asserted. An addition of diphenyl ether as a third component modifies the single solidification point for the stearic/oleic acid mixture.

In contradistinction to the above, the present invention utilizes pairs of constituents correlated to the temperature parameters noted above in which the heat of fusion of the high temperature and the heat of fusion of the low temperature component may be utilized alternately where each member of the pair acts in an independent and non-reactive manner. The present invention provides a combination heat storage and heat sink material wherein the same formulation can function either as a heat source or, in the alternative, as a heat sink. Thus, the present invention utilizes the same material to provide auxiliary heat supplied during heating mode operation of a heat pump and, alternatively, as a heat sink to receive heat during air-cooling periods.

SUMMARY OF THE INVENTION

This invention includes a combination heat source and heat sink material which is made up of two constituents which constitute a pair. The constituents are non-reactive with each other and each has a definite phase change characteristic. However, the mixture itself alters in some cases, depending upon concentration, the melting points of each member of the pair so that the transition temperatures of the phase changes in the mixture are somewhat different and somewhat lower than the phase changes characteristic of the independent constituents and is dependent upon the concentration of the constituents in the mixture. This is consonant with phase change systems where components are completely miscible in the liquid state and the solid phase consists of pure components. Cf. Samuel Glasstone, *Textbook of Physical Chemistry*, 2d edition, Van Nostrand Co., New York, 1946, pages 745–749. Thus, this invention comprises several paired combinations which produce respective phase change transition temperatures in the mixture which are somewhat different from the phase change temperatures of the independent constituents, depending in part on the concentration of the constituent in the mixture. By selecting one of the constituents having a phase change at certain preselected values, it is possible to provide the material with the capability of absorbing heat in the temperature range of between about 35° F. and about 55° F. Therefore, hot air passing through a heat exchanger containing this material would lose some of its heat and thereby become cooled for air conditioning purposes. Similarly, by selecting the second constituent from those having a phase change transition temperature between 90° F. and about 130° F., cooler air passing through a heat exchanger containing this material would be warmed for heating purposes.

Paired materials which have been found operable in the present invention are: oils/waxes; $C_8$ saturated organic acids/$C_{14}$-$C_{18}$ saturated organic acids; $C_{10}$-$C_{12}$ alcohols/$C_{14}$-$C_{18}$ saturated organic acids; and $C_{10}$-$C_{12}$ alcohols/waxes.

In the chart below denoted Table 1 are set out operable concentration ranges for representative components of the various pairs covered by the present invention. Additionally, Table 2 shows clearly by chart the difference between the melting points of the pure compounds, such as selected acids and alcohols, as contrasted with the generally lower transition temperatures when used in a 50/50 concentration as pairs.

as the high component is Sunoco P116 hydrocarbon wax.

TABLE 1

Transition Temperatures in Relation to Composition

| | System | Compositions (Weight Percent) | | | | | | | |
|---|---|---|---|---|---|---|---|---|---|
| | | 10% / 90% | 20% / 80% | 30% / 70% | 40% / 60% | 50% / 50% | 60% / 40% | 70% / 30% | 80% / 20% |
| | | °F | °F | °F | °F | °F | °F | °F | °F |
| Low Temp. Component<br>High Temp. Component | Enjay $C_{15}$-$C_{16}$ Oil<br>Sunoco P116 Wax | | 55°<br>109° | 49°<br>104° | 49°<br>98° | 49°<br>92° | 49°<br>83° | 48°<br>72° | |
| Low Temp. Component<br>High Temp. Component | Octanoic Acid<br>Myristic Acid | 43°<br>117° | 43°<br>108° | 43°<br>98° | 43°<br>89° | 43°<br>79° | | | |
| Low Temp. Component<br>High Temp. Component | Octanoic Acid<br>Palmitic Acid | 42°<br>131° | 43°<br>122° | 44°<br>113° | 45°<br>103° | 46°<br>92° | 47°<br>80° | | |
| Low Temp. Component<br>High Temp. Component | Octanoic Acid<br>Stearic Acid | 48°<br>144° | 47°<br>137° | 47°<br>130° | 47°<br>123° | 47°<br>114° | 47°<br>102° | 46°<br>83° | |
| Low Temp. Component<br>High Temp. Component | Decyl Alcohol<br>Palmitic Acid | | 134° | 29°<br>119° | 30°<br>112° | 31°<br>105° | 31°<br>95° | 31°<br>82° | |
| Low Temp. Component<br>High Temp. Component | Decyl Alcohol<br>Stearic Acid | | 145° | 140° | 30°<br>135° | 32°<br>130° | 32°<br>125° | 32°<br>116° | 33°<br>100° | 33°<br>70° |
| Low Temp. Component<br>High Temp. Component | Decyl Alcohol<br>Sunoco P116 Wax | 35°<br>115° | 35°<br>113° | 35°<br>111° | 35°<br>108° | 35°<br>105° | 35°<br>103° | 35°<br>100° | 35°<br>93° |

TABLE 2

Transition Temperatures for 50:50 Weight Percent Mixes

| Low Temp. Component | Melting Point Pure Compound (°F) | Transition Temp. Actual (°F) | Transition Temp. Predicted (°F) | High Temp. Component | Melting Point Pure Compound (°F) | Transition Temp. Actual (°F) | Transition Temp. Predicted (°F) |
|---|---|---|---|---|---|---|---|
| Octanoic Acid | 61° | 43° | 34° | Myristic Acid | 129.3° | 91° | 98° |
| Octanoic Acid | 61° | 49° | 36.5° | Palmitic Acid | 145° | 109° | 106.5° |
| Octanoic Acid | 61° | 51° | 38.5° | Stearic Acid | 157° | 125.6° | 125.5° |
| Decyl Alcohol | 44.6° | 33.8° | 28.6° | Palmitic Acid | 145° | 115° | 108.5° |
| Decyl Alcohol | 44.6° | 34.5° | 29.4° | Stearic Acid | 157° | 130° | 127° |

THE CONSTITUENT PAIRS

Oil/Wax

The oil is a hydrocarbon oil selected as the low temperature melting point component. A utilizable oil consists primarily of normal straight chain paraffins having 14-16 carbon atoms, such as Enjay $C_{15}$-$C_{16}$ (Exxon). This product melts within the range from 40° F. to 50° F. Also operable is the paraffinic product designated as Conoco $C_{14}$-$C_{16}$.

A preferred wax is Sunoco P116 melting at 116° F. and having a density of 49 lb/cu. ft. Also operable is Arco paraffin wax and waxes having a density range of 40-50 lbs/cu. ft.

Acid/Acid

Both pairs of organic acids are saturated organic acids, $C_8$ and $C_{14}$-$C_{18}$. The low temperature $C_8$ acid is designated octanoic acid and illustrative of the high temperature component are myristic $C_{14}$, palmitic $C_{16}$, or stearic $C_{18}$.

Alcohol/Acid

Utilizable as the low temperature component is a $C_{10}$-$C_{12}$ saturated alcohol, such as decyl alcohol and dodecyl alcohol, and as the high temperature component, myristic $C_{14}$, palmitic $C_{16}$, or stearic acid $C_{18}$.

Alcohol/Wax

Utilizable as the low component is a $C_{10}$-$C_{12}$ saturated alcohol, such as decyl alcohol and dodecyl alcohol, and

CONCENTRATION OF THE COMPONENTS WITHIN EACH PAIR

It has been found that, due to mutual solubility properties and other factors, there are preferred and operable concentration limits within several of the pairs and these values are set out in Table 1, supra.

EXAMPLE 1

Oil-Wax Combination

Equal weights of wax and oil were heated above the melting point of the wax which was approximately 116° F. At this time a clear, single phase liquid was formed. On cooling, the temperature of the single phase liquid mixture decreased at a constant rate until the melting point of the wax was reached. At this temperature, the higher molecular weight wax crystallized out of solution. This crystallization or freezing was accompanied by release of thermal energy corresponding to the heat of melting of the wax. During crystallization, the cooling curve remained horizontal and the temperature of the material remained essentially constant until all the wax had frozen or crystallized. When all of the wax had crystallized, cooling resumed until the freezing point of the oil was reached. At this temperature, the oil began to freeze an the temperature of the material remained essentially constant until all of the oil had frozen. After all of the materials were solidified, any additional storage of "coolness" would be by virtue of the sensible heat of the solid material.

EXAMPLE 2

Figure 1:
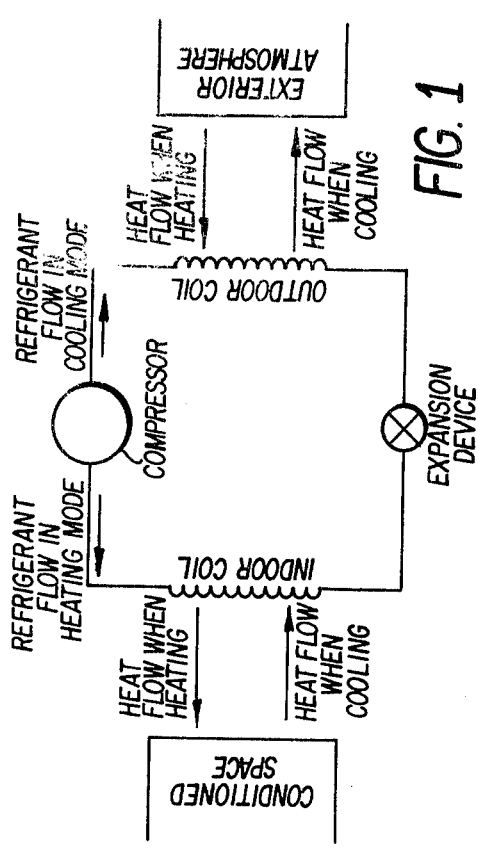
FIG. 1 is a schematic diagram of an air-to-air heat pump.

Modus of Operation of Dual Temperature Thermal Energy Storage (TES) with Heat Pump The use of a material composition having the capability of storing heat at two preselected phase change temperatures in conjunction with a heat pump may be visualized as follows:

Initially refer to accompanying FIG. 1 (cf. W. F. Stoecker, *Refrigeration and Air Conditioning*, McGraw-Hill, New York, 1958). FIG. 1 shows schematically the direction of refrigerant flow for both cooling mode and heating mode operation and calls specific attention to the indoor and outdoor coils and their thermal function in both of the operational modes.

Figure 2:
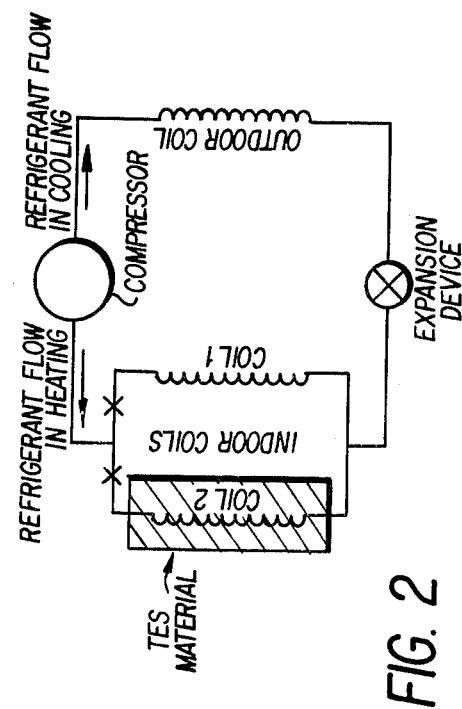
FIG. 2 is a schematic diagram illustrating an indoor coil operation.

The basic heat pump may be visualized as coupled with the thermal energy storage subsystem as in FIG. 2 by dividing the indoor coil of FIG. 1 into two indoor coils parallel with one another and using appropriate valving so that the refrigerant flow may be directed to either one of these coils as desired.

Figure 3:
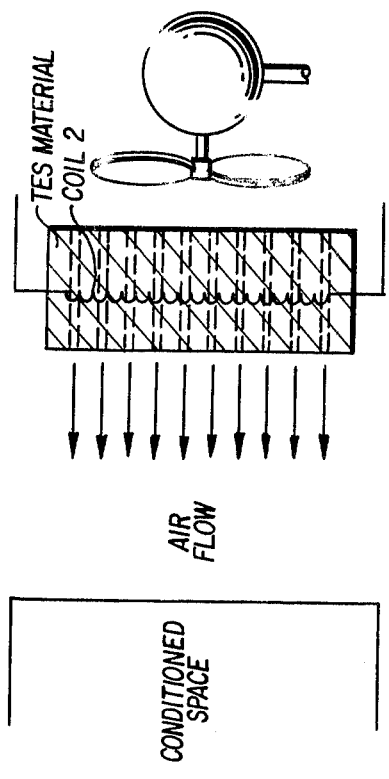
FIG. 3 is a schematic representation of the operation of thermal energy storage material.

The first indoor coil would function in the normal manner for direct conditioning of interior air in either the heating or cooling mode. The second indoor coil is surrounded by and immersed in the dual temperature TES composition. The container for the TES material is shown as having a multiplicity of tubular passages through which the residential air to be conditioned is forced to flow. This arrangement is shown schematically in FIG. 3.

During heating mode operation either of the two parallel indoor coils can function as the condenser. Heat is delivered directly to the conditioned space by use of the first indoor coil or delivered to the thermal storage bank by use of the second indoor coil. Ideally, heat is delivered to and stored in the TES material during the warmer periods of the day when the heat pump is capable of operating at highest efficiency and drawn from the storage bank during the cooler portion of the day to augment the heat pump output at such times. The actual storage of heat in the TES material occurs by virtue of the latent heat of fusion associated with the material phase change and may be best understood by reference to the schematic plot shown in FIG. 4.

Figure 4:
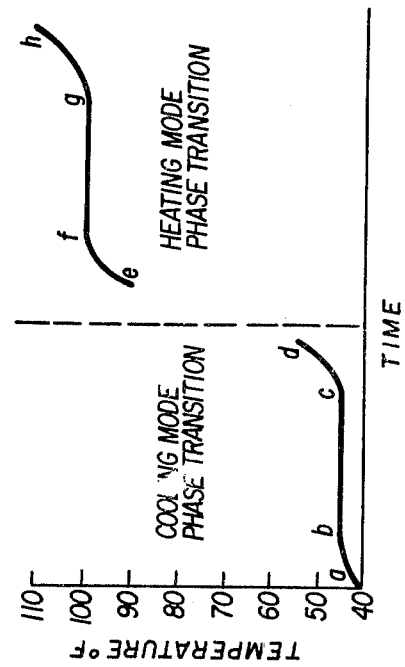
FIG. 4 shows cooling and heating modes phase transition.

Assume that the heat pump is operating in the heating mode and that the TES bank is at a temperature corresponding to Point "e" in FIG. 4. The low temperature component is fully melted and contributes to storage only by virtue of its sensible heat capacity. The high temperature component is in the solid state. As heat is delivered to the storage bank from the condenser coil, the temperature rises to Point "f" at which time melting commences in the high temperature component. As further heat is added to the storage bank, a progessively larger fraction of the high temperature component melts, but the temperature is maintained at a constant level along the plateau "f-g" as the added heat is absorbed to provide the latent heat requirements of the high temperature component. The level of plateau "f-g" will, of course, depend upon the choice of materials and their composition in the two-component mixture. When all of the higher temperature component has melted, the temperature rises along line "g-h" and further storage is as sensible heat in the combined melt of the two components. The temperature of the TES storage bank continues to rise until its temperature approaches that for the condensing temperature of the working fluid (refrigerant) under the prevailing system pressure.

Conversely, when heat is withdrawn from the storage bank for heating of the conditioned space, the major fraction is delivered at a constant temperature as the melt solidifies along the plateau "g-f." The presence of the high temperature component in the mixture provides a convenient means for storing and supplying heat at a fixed and preselected temperature and also provides a means for high density storage by virtue of the latent heat effect associated with the phase change.

When operating in the cooling mode, the low temperature component comes into play and undergoes its phase transition at a fixed temperature along the plateau "b-c." Again the level of this plateau is governed by the choice of materials and their composition in admixture. The low temperature component stores "coolness" by freezing and delivers "coolness" as it melts along the plateau "b-c." Thus, the low temperature component functions like water-ice but at a temperature where charging from the heat pump evaporator coil is more efficient and the equilibrium temperature is more appropriate to comfort conditioning of interior air.

We claim:

1. A thermal energy storage material comprising at least two dissimilar, non-reactive paired organic constituents in a mixture, one of said constituents having a phase change transition temperature in the range of between about 35° F. and about 55° F. and the other having a phase change transition temperature in the range of between about 90° F. and about 130° F., each phase change transition temperature for one constituent occurring in mixture with the other constituent, said mixture consisting of paired constituents selected from one member of a group consisting of (a) a low m.p. $C_{14}$-$C_{16}$ straight chain paraffin oil paired with a high m.p. paraffin or hydrocarbon wax (oil/wax); (b) a $C_8$ fatty acid paired with an acid selected from one member of the group consisting of a $C_{14}$-$C_{18}$ fatty acid (acid/acid); (c) an alcohol selected from one member of the group consisting of a $C_{10}$-$C_{12}$ alcohol paired with an acid selected from one member of the group consisting of a $C_{14}$-$C_{18}$ fatty acid (alcohol/acid); and (d) an alcohol selected from one member of the group consisting of a $C_{10}$-$C_{12}$ alcohol paired with a paraffin or hydrocarbon wax (alcohol/wax).

2. The thermal energy storage material according to claim 1 wherein the material is oil/wax and the oil consists primarily of straight chain paraffins having 14–16 carbon atoms and the wax melts at 110°–120° F. and has a density of 40–50 lbs/cu. ft.

3. The thermal energy storage material according to claim 2 wherein the weight percent of the oil is from about 20%–50% and the weight percent of the wax is from about 80%–50%.

4. The thermal energy storage material according to claim 1 wherein the material is acid/acid and the $C_8$ acid is octanoic acid and the $C_{14}$-$C_{18}$ acid is myristic acid.

5. The thermal energy storage material according to claim 4 wherein the weight percent of the octanoic acid is from about 10%–30% and the weight percent of the myristic acid is from about 90%–70%.

6. The thermal energy storage material according to claim 1 wherein the material is acid/acid and the $C_8$ acid is octanoic acid and the $C_{14}$-$C_{18}$ acid is palmitic acid.

7. The thermal energy storage material according to claim 6 wherein the weight percent of the octanoic acid is from about 10%–50% and the weight percent of palmitic acid is from about 90%–50%.

8. The thermal energy storage material according to claim 1 wherein the material is acid/acid and the $C_8$ acid is octanoic acid and the $C_{14}$-$C_{18}$ acid is stearic acid.

9. The thermal energy storage material according to Claim 8 wherein the weight percent of the octanoic acid is from about 30%–60% and the weight percent of stearic acid is from about 70%–40%.

10. The thermal energy storage material according to claim 1 wherein the paired constituents are an alcohol selected from one member of the group consisting of a $C_{10}$-$C_{12}$ alcohol / an acid selected from one member of the group consisting of a $C_{14}$-$C_{18}$ fatty acid.

11. The thermal energy storage material according to claim 10 wherein the paired constituents ae decyl alcohol/palmitic acid.

12. The thermal energy storage material according to claim 11 wherein the weight percent of the decyl alcohol is about 50% and the weight percent of the palmitic acid is about 50%.

13. The thermal energy storage material according to claim 10 wherein the paired constituents are decyl alcohol/stearic acid.

14. The thermal energy storage material according to claim 13 wherein the weight percent of the decyl alcohol is about 50% and the weight percent of the stearic acid is about 50%.

15. The thermal energy storage material according to Claim 1 wherein the paired constituents are an alcohol selected from one member of the group consisting of $C_{10}$-$C_{12}$ alcohol / paraffin or hydrocarbon wax.

16. The thermal energy storage material according to claim 15 wherein the paired constituents are decyl alcohol/wax and the weight percent of the decyl alcohol is from about 10%–80% and the weight percent of the wax is from about 90%–20%.

* * * * *